United States Patent
Beckmann et al.

(10) Patent No.: US 8,517,599 B2
(45) Date of Patent: Aug. 27, 2013

(54) METHOD AND APPARATUS FOR MIXING A GASEOUS FLUID WITH A LARGE GAS STREAM, ESPECIALLY FOR INTRODUCING A REDUCING AGENT INTO A FLUE GAS THAT CONTAINS NITROGEN OXIDES

(75) Inventors: Gerd Beckmann, Gummersbach (DE);
Wolfram Engelking, Wiehl (DE);
Ulrich Priesmeier, Gummersbach (DE)

(73) Assignee: Fisia Babcock Environment GmbH (DE)

( * ) Notice: Subject to any disclaimer, the term of this patent is extended or adjusted under 35 U.S.C. 154(b) by 1109 days.

(21) Appl. No.: 12/162,215

(22) PCT Filed: Jan. 26, 2007

(86) PCT No.: PCT/EP2007/000689
§ 371 (c)(1),
(2), (4) Date: Jul. 25, 2008

(87) PCT Pub. No.: WO2007/085472
PCT Pub. Date: Aug. 2, 2007

(65) Prior Publication Data
US 2009/0003127 A1 Jan. 1, 2009

(30) Foreign Application Priority Data
Jan. 28, 2006 (DE) .................. 10 2006 004 068

(51) Int. Cl.
*B01F 3/02* (2006.01)
*B01F 5/04* (2006.01)

(52) U.S. Cl.
USPC ........................................ 366/340

(58) Field of Classification Search
USPC ........................................ 366/340
See application file for complete search history.

(56) References Cited

U.S. PATENT DOCUMENTS

| | | | | |
|---|---|---|---|---|
| 4,498,786 | A | * | 2/1985 | Ruscheweyh ............... 366/336 |
| 4,955,183 | A | | 9/1990 | Kolodzie et al. |
| 5,356,213 | A | | 10/1994 | Arpentinier |
| 6,279,611 | B2 | * | 8/2001 | Uematsu et al. ............ 366/336 |
| 6,449,947 | B1 | | 9/2002 | Liu et al. |
| 2003/0013931 | A1 | | 1/2003 | Block et al. |
| 2003/0070424 | A1 | | 4/2003 | Verdegan et al. |
| 2005/0189026 | A1 | | 9/2005 | Hansen |
| 2005/0190643 | A1 | | 9/2005 | Hansen |

FOREIGN PATENT DOCUMENTS

| | | |
|---|---|---|
| DE | 37 23 618 | 12/1988 |
| DE | 40 21 817 | 2/1991 |
| DE | 93 21 122 | 3/1996 |
| DE | 101 29 367 | 9/2003 |

(Continued)

OTHER PUBLICATIONS

Führer durch die Strömungslehre, Fig. 4.41.

*Primary Examiner* — Yogendra Gupta
*Assistant Examiner* — Alison Hindenlang
(74) *Attorney, Agent, or Firm* — Robert Becker; Becker & Stachniak, P.C.

(57) ABSTRACT

A method and apparatus for mixing at least one fluid stream with a large gas stream flowing in a gas duct, especially for introducing reducing agent into flue gas containing nitrogen oxides. The gas stream is directed against at least one disk-shaped mixer element on an inlet side that is inclined at an angle counter to the direction of flow of the gas stream, wherein eddy-type whirls form at the mixer element. A swirled fluid stream is admixed with the large gas stream downstream of the mixer element.

13 Claims, 4 Drawing Sheets

(56) References Cited

FOREIGN PATENT DOCUMENTS

| | | |
|---|---|---|
| EP | 0 637 726 | 2/1995 |
| EP | 0 956 895 | 11/1999 |
| EP | 1 166 861 | 1/2002 |
| EP | 1 604 742 | 12/2005 |
| EP | 1 605 204 | 12/2005 |

* cited by examiner

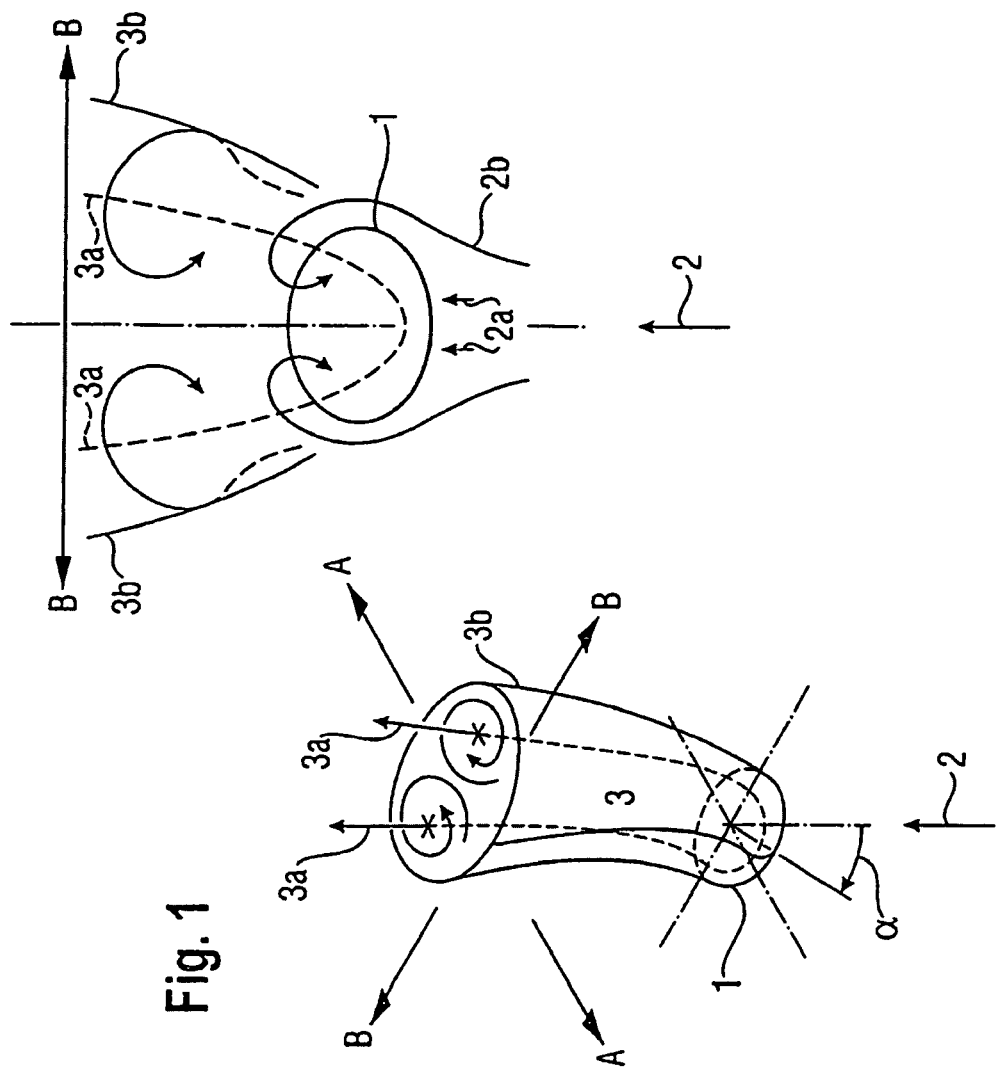

METHOD AND APPARATUS FOR MIXING A GASEOUS FLUID WITH A LARGE GAS STREAM, ESPECIALLY FOR INTRODUCING A REDUCING AGENT INTO A FLUE GAS THAT CONTAINS NITROGEN OXIDES

BACKGROUND OF THE INVENTION

The instant application should be granted the priority dates of Jan. 28, 2006, the filing date of the corresponding German patent application 10 2006 004 068.6 as well as Jan. 26, 2007, the filing date of the International patent application PCT/EP2007/000689.

The present invention relates to a method of mixing at least one fluid stream with a large gas stream, especially for introducing a reducing agent into a flue gas that contains nitrogen oxides, and also relates to an apparatus for mixing at least one fluid stream with a large gas stream that flows in a gas duct, especially for introducing a reducing agent into a flue gas that contains nitrogen oxides.

EP 1 604 742 A1 discloses such a method in conjunction with electric filters for the dust separation of large gas streams, according to which the flow whirl, which is formed at the inclined mixer disk, is designated as a leading edge whirl. The edge of the preferably circular disk that is directed against the large gas stream is designated as the intake edge and the other edge is designated as the breaking edge. These are not linear edges but rather curved edges.

The vertical wall of the gas duct that guides the large gas stream has a short section of pipe for the admixture of a conditioning fluid passed perpendicularly therethrough. The short pipe section opens out, as viewed in the direction of flow of the large gas stream, behind the intake edge of the mixer disk without overlapping the mixer disk. The laminar conditioning agent stream that exits the short pipe section strikes the edge-continuous partial surface of the discharge side of the mixer disk, adjacent to the section outlet, at an angle that corresponds to the angle of inclination of the disk relative to the direction of flow of the large gas stream.

With this procedure, the conditioning agent is not optimally mixed into the whirl system that results at the mixer disk.

Column 6, lines 5-6, of EP 1 604 742 A1 indicates that methods are also expedient according to which the admixture device is mounted directly on the whirl apparatus.

U.S. Pat. No. 5,356,213 A, in conjunction with a gas phase oxidation process in the petrochemical field, discloses a method of mixing a small gas stream, e.g. oxygen, with a large gas stream, e.g. air, according to which the oxygen, in at least two swirled partial streams, is introduced into the air stream, which flows essentially undisturbed in a duct, via radially extending swirl vanes disposed on the end of a tubular section that opens in the direction of flow of the air, whereby the velocity of the oxygen is increased upstream of the swirl vanes and a cloth is stretched over the outlet end of the tubular section downstream of the swirl vanes.

With the mixing device described in EP 1 166 861 B1, in conjunction with Denox units and electric filters, the mixer disk (built-in surface) has a chamber into which leads a separate flow channel for the fluid that is to be admixed and which serves as a distribution chamber for the fluid stream. The chamber is provided on the back side (discharge side; lee side) of the mixer disk that faces away from the in-flow of the large gas stream with discharge openings from which exit in a laminar manner partial streams of the fluid stream, and is disposed in the region of the intake edge. Adjoining the distribution chamber toward the breaking edge are chambers that, however, have no distribution function nor a flow-related function, but rather serve exclusively for the reinforcement of the mixer disk. The discharge openings can be formed in the cover of the distribution chamber or in the side wall thereof. However, they can also be formed in an additional hood that is placed upon the chamber. It is furthermore possible that the chamber itself not be provided with a cover that is parallel to the mixer disk, but rather itself have a hood-shaped configuration. The flow channel for the supply of fluid can enter from the windward side of the mixer disk through the disk, or can be guided to the distribution chamber on the lee side of the mixer disk. With the method described in EP 1 166 861 B1 an additional chamber is required and the mixing-in is again effected only in the vicinity of the intake edge.

Such methods, designated as mixing methods having a static mixer, are, for example, also used with SCR units, to reduce the $NO_x$ level (Selective Catalytic Reduction) of flue gases, for example of power plant furnaces, by means of reducing agent and catalyzer. In this connection, it is customary, where the reducing agent is $NH_3$, that it is stored in the form of pressure-condensed $NH_3$ or of ammonium hydroxide ($NH_4OH$), and pre-vaporized $NH_3$ is sprayed into the flue gas stream via a carrier gas stream and is mixed with the flue gas stream. Where the reducing agent is urea, first an aqueous urea solution is produced that, after suitable processing, is then sprayed into the flue gas stream in gaseous form.

The methods are furthermore used, for example, for industrial chimneys, spray driers (See e.g. EP 0637 726 B1), heat exchangers, flue desulfurization units, and hybrid cooling towers.

It is an object of the present invention, for the method and the apparatus of the aforementioned general types, to improve the mixing of the fluid stream into the large gas stream.

SUMMARY OF THE INVENTION

This object is realized by a method that includes the steps of directing the large gas stream against at least one disk-shaped mixer element on an inlet or windward side thereof, wherein the mixer element is inclined at an angle counter to the direction of flow of the large gas stream, and wherein eddy-type whirls are adapted to form at the mixer element: and admixing a swirled fluid stream with the large gas stream downstream of the at least one disk-shaped mixer element. The object is also realized by an apparatus comprising at least one disk-shaped mixer element disposed in the gas duct and having an inlet or windward side and a discharge or lee side, wherein the mixer element forms an angle with the direction of flow of the large gas stream, and wherein eddy-type whirls are adapted to form at the mixer element: a tubular admixing device for the fluid stream: and a swirl device associated with the admixing device upstream of a fluid stream outlet of the admixing device.

The important thing with the present invention is that the fluid stream is add in or admixed as a swirled stream.

By pre swirling the fluid prior to entry into the whirl system, admixing into the large gas stream is improved.

To further improve the admixing, the swirled fluid stream is preferably guided essentially perpendicularly onto the mixer element, and essentially onto the center of the mixer element on the discharge side (lee side) of the mixer element, and the fluid enters the eddy-type whirls from the center along the discharge side.

However, it is also possible to guide the swirled fluid stream essentially perpendicularly onto the mixer element on the inlet side (windward side) and for it to exit onto the discharge side (lee side) of the mixer element through an opening provided essentially in the center of the mixer element, whereby the fluid enters into the eddy-type whirls from the center along the discharge side.

With the strong swirl stream or jet, the centrifugal force produces an underpressure along the jet axis and forms an outwardly pressing or extending hollow jet that with a suitable design of the opening of the supply conduit (radius, smooth transition) follows the curvature of the wall at the outlet (Coanda effect) and opens out until it forms a flat jet.

With both variations, due to the perpendicular orientation, there results on the lee side a rotationally symmetrically flat narrow stream or jet that extends parallel to the surface of the mixer element and expands essentially radially. With a swirled supply, the velocity of the flat jet, in addition to having a radial component, also has a circumferential component. The circumferential component is the greatest within the outlet or discharge (nozzle), and from the outlet decreases with increasing radial spacing.

In the case of a circular disk, the center is disposed in the center of the circle, and with a regular polygon is disposed in the center of gravity or centroid. If the mixer deviates from the regular shape, such as with an unequally sided triangle, trapezoid or the like, an adaptation of the discharge position (nozzle position) is required in order nonetheless to achieve a largely uniform distribution of the fluid across the discharge side of the disk-shaped mixer element.

With both methods, the fluid is distributed across the entire discharge side of the mixer element and is incorporated into the entire whirl system formed at the peripheral edge.

With the apparatus according to the present invention, to improve the mixing process a swirl device is provided in the admixing device upstream of the fluid outlet.

Swirl devices that can be used are known, for example, in the burner technology.

The fluid outlet of the admixing device, which has a rounded or curved configuration, can expediently be disposed on the discharge side (lee side) of the mixer element and is oriented essentially perpendicular to, and essentially onto, the center of the mixer element.

However, it is also possible to associate the rounded or curved fluid outlet of the admixing device with an essentially central opening of the mixer element out of which the swirled fluid stream, which is supplied essentially perpendicularly to the mixer element, exits toward the discharge side.

The mixer disk preferably has a circular, elliptical, oval, parabola, diamond, or triangular configuration, as is known from DE 37 23 618 C1, Column 2, lines 40-45. A polygonal configuration, for example 8-cornered, is also possible. Particularly preferred is the shape of a symmetrically structured 8-polygon, and further preferably a regular 8-polygon. A polygon in the form of a trapezoid is also particularly suitable.

The mixer disk is preferably inclined relative to the direction of flow of the gas stream at an angle in the range of between 30° to 90°.

To limit the intake of dust into the supply device caused by a return flow, a dust-protecting plate is expediently disposed upstream or in the opening in the mixer element.

The swirl device is preferably disposed in the supply conduit of the admixing device or is disposed upstream of the supply conduit.

The swirl device is-preferably selected from the group: swirl producer with radial grating, swirl producer with axial grating, swirl producer with tangential in-flow.

BRIEF DESCRIPTION OF THE DRAWINGS

The invention will be explained in greater detail subsequently by way of example and with the aid of the figures, in which:

FIG. 1: shows a 3-dimensional representation of a horseshoe eddy with eddy wake obtained at a circular disk against which a gas stream flows and that is inclined relative to the stream at an angle a, FIG. 2: is a side view transverse to the line A-A in FIG. 1, FIG. 3: is a front view onto the lee side of the disk transverse to the line B-B in the illustration of FIG. 1, FIG. 4: is a partial cross-sectional view/side view comparable to FIG. 2 of a first embodiment of the inventive apparatus with an 8-cornered mixer disk, according to which the swirled fluid stream is guided onto the discharge side (lee side) of the mixer disk and exits to the discharge side through an opening in the mixer disk.

DESCRIPTION OF PREFERRED EMBODIMENTS

Figure 5:
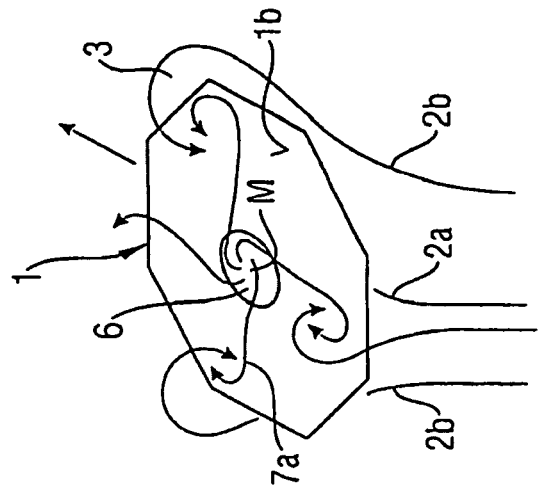
FIG. 5: is a perspective illustration of the apparatus of FIG. 4 with a view onto the discharge side of the mixer disk.

The formation of eddy trails or wakes involves a natural phenomenon in three-dimensional flows at a body (See Prandtl, Oswabtsch, Wieghardt; GUIDE THROUGH FLUID DYAMICS, $9^{TH}$ Edition 1990; ISBN 3-528-28209-6, page 229, FIG. 4.41 and pertaining text).

The formation, the shape and position of such eddy wakes in the downflow of mixer disks are first schematically illustrated in FIGS. 1-3 and will be described in conjunction therewith.

A circular disk 1 is inclined at an angle a relative to the flowing gas stream 2, which in FIG. 1 comes from below. On the windward or inlet side 1a of the disk, the gas stream is deflected from its main direction of flow, and there results a high-pressure zone. The partial stream 2a of the gas stream 2 flows at a prescribed angle along and below the disk. On the lee or discharge side 1b of the disk, a low-pressure zone forms that is filled beyond the edge of the disk by the partial stream 2a of the gas stream 2. Due to the flow deflection at the edge of the disk, there is formed a horseshoe eddy 3 having the eddy axis 3a, which is shown by a dashed line and that continues downstream of the disk in the form of an eddy wake having two symmetrically rotating eddies or whirls. The lateral eddies of the horseshoe eddy continue as wakes, overlap or superpose with the gas stream (principal stream), and expand with the principal stream. The flow condition within the eddy wake is very turbulent. The schematically illustrated boundary 3b of the horseshoe eddy and wake should not be seen as a sharply defined demarcation. The position and the structure of the two eddies as well as the opposite directions of rotation thereof, can be experimentally determined with suitable measuring techniques.

Comparable eddies having wakes are formed with other disk shapes, such as elliptical, oval, parabola, diamond, polygonal or triangular shapes.

The turbulent intermixing of eddy wakes and gas stream is utilized to distribute a gas stream that is metered-in in a nearly point-type manner over a very large cross-sectional area.

Figure 4:
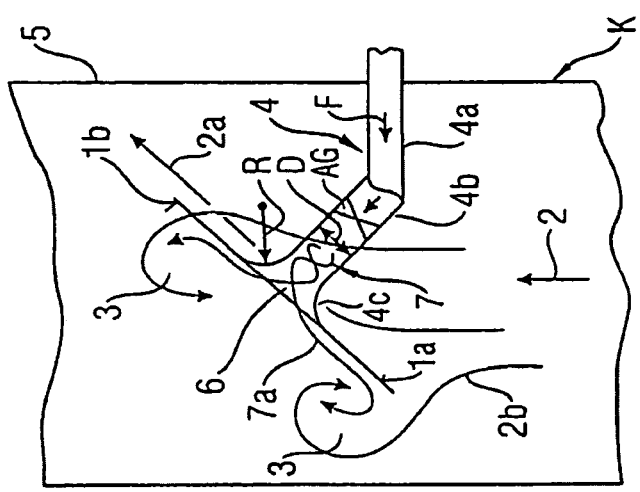

With the embodiment of the inventive apparatus shown in FIGS. 4 and 5, a supply conduit 4, which serves for the supply of the fluid F that is to be mixed in, extends via a linear section 4a through the wall 5 of a Is duct K that guides the large gas stream 2 and in which an 8-conered mixer disk 1 is disposed at an angle. Adjoining the conduit section 4a is an angled-off conduit section 4b that is oriented perpendicular to the center M of the windward or inlet side 1a of the mixer disk 1. An opening 6 is provided in the middle M of the disk.

As schematically indicated in FIG. 4, a swirl device DE, in the form of an axial grid or grating AG, is disposed in the conduit section 4a and is thus arranged ahead or upstream of the outlet 4c of the conduit.

The axial grating AG and further examples for possible swirl devices are described starting on page 16, $2^{nd}$ paragraph.

The outlet end of the angled-off conduit section 4b is provided with a curved outlet 4c that is rounded with the prescribed radius R, i.e. is constantly flared or expanded, and is oriented toward the opening 6 and is connected to the disk. The radius of curvature or rounding-off R is preferably R=D/2, with D being the conduit diameter.

The swirled fluid stream 7 exiting the outlet 1c is distributed over the discharge side under the influence of the swirl, as is schematically illustrated in FIG. 5 by the arrows 7a. Mixing in or admixture into the flow whirls or eddy-type whirls 3 is effected in the region of the peripheral edge of the mixer disk.

Figure 6:
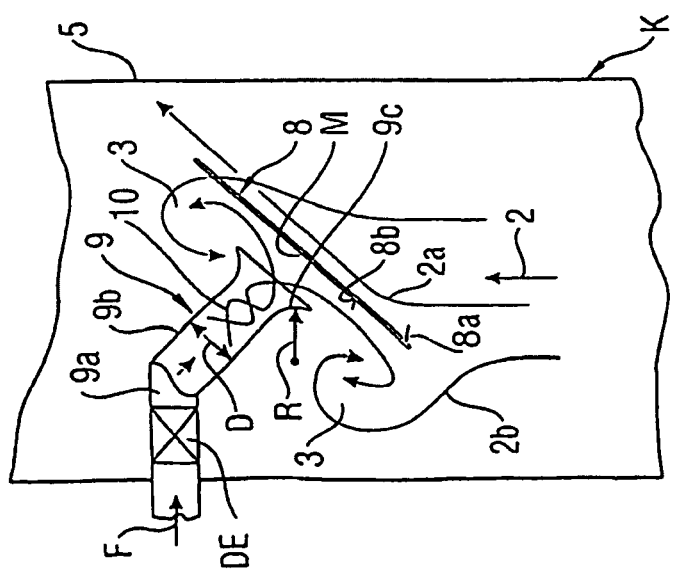
FIG. 6: is a partial cross-sectional view/side view comparable to FIG. 4 of a second embodiment of the inventive apparatus, according to which the swirled fluid stream is guided centrally onto the discharge side of the mixer disk.

With the embodiment of the inventive apparatus shown in FIG. 6, with the 8-cornered mixer disk 8, a supply conduit 9 extends via a linear section 9a through the wall 5 of a duct K that guides the large gas stream 2 and in which the mixer disk 8 is disposed at an angle. Adjoining the conduit section 9a is an angled-off conduit section 9b that is oriented perpendicular to the center M of the lee or discharge side 8b of the mixer disk 8, and that is provided on its outlet end with a rounded-off or curved outlet 9c. The outlet 9c is spaced from the discharge side 8b (lee side) of the mixer disk 8. A swirl device DE is provided in the conduit section 9a.

However, the disposition of the swirl device DE in, or an association of the swirl device to, the angled-off section, as with the embodiment of FIGS. 4 and 5, is preferred, since then the swirled stream can exit from the outlet without further deflection in the conduit.

The swirled fluid stream 10 exiting the outlet 9c is distributed over the discharge side 8b, as is correspondingly schematically illustrated for the fluid stream 7 by the arrows 7a in FIG. 5. The mixing-in or admixing into the flow whirls or eddy-type whirls 3 is effective in the region of the peripheral edge of the mixer disk 8.

The conduits 4 and 9 need not necessarily be angled-off in the duct K; the fluid need only be supplied to the mixer disk in a perpendicular manner, i.e. an inclined guiding of the conduit through the duct wall 5 would also be conceivable. It is furthermore conceivable for at least one further conduit section to extend parallel to the wall of the duct.

Figure 7:
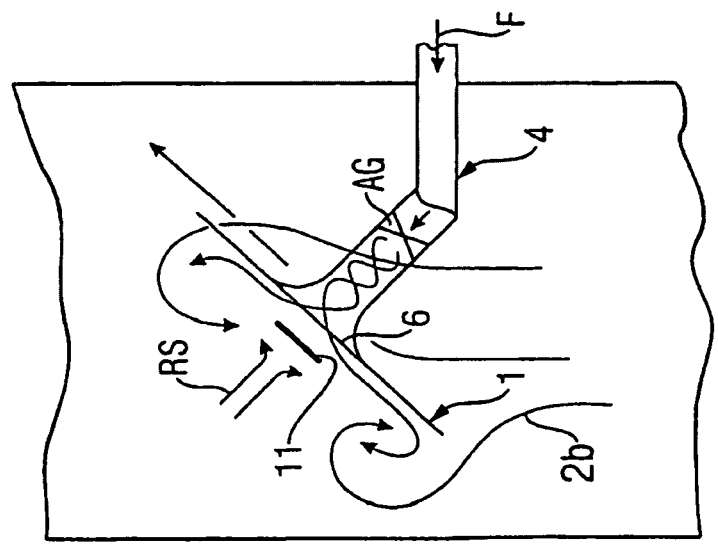
FIG. 7: is a partial cross-sectional view/side view according to FIG. 4 with a dust-protecting plate as a built-in return flow blocking device.

As shown in FIG. 7, a dust-protecting plate 11 can be associated with the opening 6. If the strong swirl stream or jet is used in a dust-containing environment, dust can pass back into the supply conduit 4 via the return flow RS that forms along the jet axis. Due to the centrifugal force, the dust possibly migrates partially against the conduit wall, where it could lead to deposits. The dust-protecting plate 11 can prevent this.

It is to be understood that with large duct cross sections a plurality of mixer disks having fluid supply associated therewith can be distributed over the cross-section of the duct in a plane or can be staggered in one or more planes.

Examples of possible swirl devices are described in the following: With burners, a peripheral component is frequently superimposed over a combustion air stream in order to radially expand the flame. This expansion can be carried out until the flame breaks open and lies against the combustion chamber wall as a so-called flat flame. Typical for swirled burner flows is an underpressure zone that is intentionally utilized to stabilize the flame.

Figure 8:
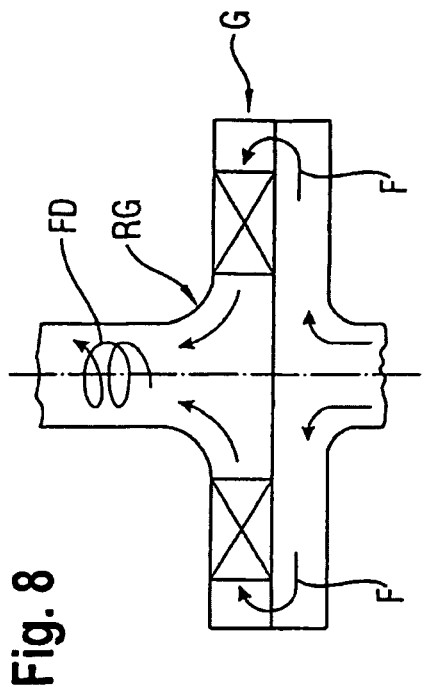
FIG. 8: is a vertical-cross sectional view through a swirl device embodied as a radial grating.
Figure 9:
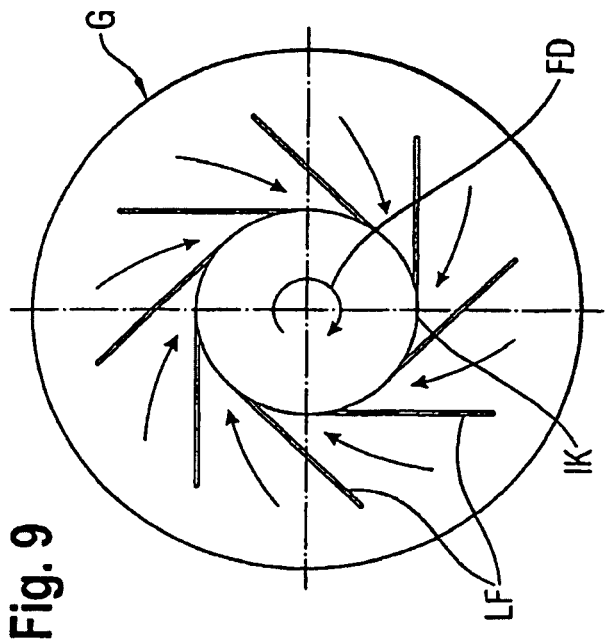
FIG. 9: is a horizontal cross-sectional view through the radial grating of FIG. 8, FIG. 10: is a vertical cross-sectional view through a swirled device embodied as an axial grating.

The following techniques are, for example, known: With the swirl generation using a radial grid or grating RG pursuant to FIGS. 8 and 9, a plurality of fins or deflectors LF are disposed tangentially to an inner circle IK in a housing G. The swirled fluid stream FD is withdrawn centrally.

Figure 10:
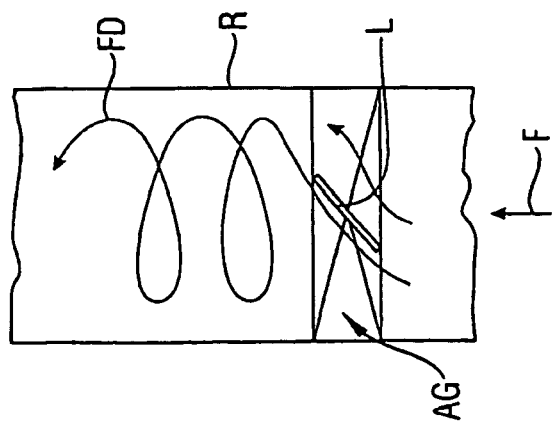
Figure 11:
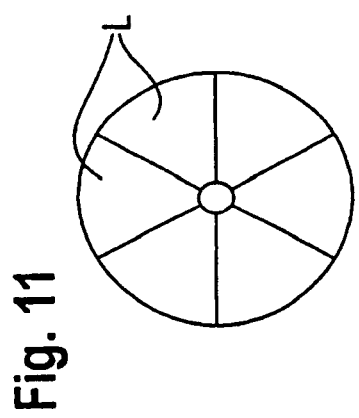
FIG. 11: is a horizontal cross-sectional view through the axial grating of FIG. 10, FIG. 12: is a vertical cross-sectional view through a swirl device having a spiral housing.

With the swirl generation using an axial grid or grating AG pursuant to FIGS. 10 and 11, the fluid stream F enters the axial grating AG, which is built up of a plurality of inclined guide vanes FL that are radially disposed in a conduit R; the fluid stream is swirled in the axial grating to form the stream FD.

Figure 12:
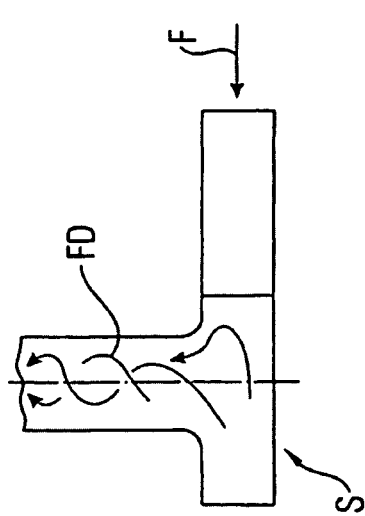
Figure 13:
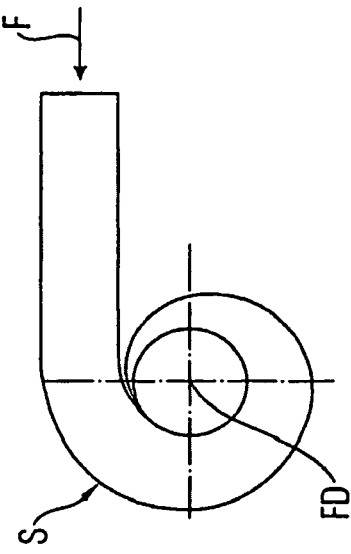
FIG. 13: is a horizontal cross-sectional view through the swirl device of FIG. 12, and FIG. 14: is a swirl device subassembly having a plurality of radial gratings.

With the swirl generation using the tangential supply pursuant to FIGS. 12 and 13, the fluid stream F is introduced into a spiral housing S and leaves it centrally as the swirled stream FD. The spiral housing serves as fins or deflectors, so that no guide vanes are required.

Figure 14:
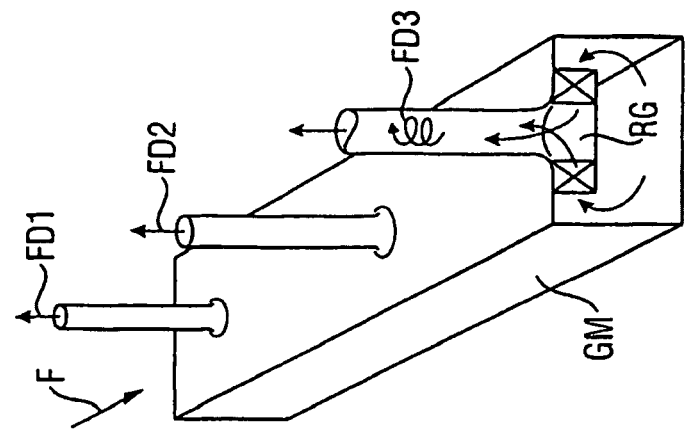

FIG. 14 shows that a plurality of swirl devices, such as radial gratings, can be combined into a subassembly in the event that a swirled fluid stream is to be supplied to a plurality of mixer disks. A plurality of radial gratings RG are disposed in a common housing GM, and a plurality of swirled partial streams FD1, FD2, FD3 are withdrawn.

Other swirl devices are also possible; reference is made, for example, to DE 40 21 817 A1, where the guide devices do not have a vane-like configuration as with the embodiment of FIGS. 10 and 11, but rather are groove-like in the conduit wall. Similar grooves are found in the fuel injection device of EP 1 605 204 A2.

The specification incorporates by reference the disclosure of German 10 2006 004 068.6 filed Jan. 28. 2006, as well as International application PCT/EP2007/000689, filed Jan. 26, 2007.

The present invention is, of course, in no way restricted to the specific disclosure of the specification and drawings. but also encompasses any modifications within the scope of the appended claims.

Reference Numeral List 1 round mixer disk
1a windward side of the disk
1b lee side of the disk
2 gas stream
2a gas stream, partial stream on the windward side of 1a of the disk
2b gas stream, partial stream toward the lee side 1b of the disk
3 horseshoe eddy and wake
3a eddy axis
3b outer boundary of the eddy
4 supply conduit
4a linear conduit section
4b angled-off conduit section
4c curved outlet 5 wall of the flue gas duct K
6 opening
7 swirled fluid stream
7a arrows of the fluid stream
8 8-cornered mixer disk
8a windward side
8b lee side
9 supply conduit
9a linear conduit section
9b angled-off conduit section
9c curved outlet
10 swirled fluid stream
11 dust-protecting plate
AG axial grid or grating
D diameter of conduit 4, 9
DE swirl device
F fluid stream
FD swirled fluid stream
G housing
GM common housing
IK inner circle
K flue gas duct
L guide vanes
LF fin or deflector
M center of the disks 1, 8
R radius of curvature of the expansion
RG radial grid or grating
RS return flow
S spiral housing

The invention claimed is:

1. A method of mixing at least one fluid stream with a large gas stream, including the steps of:
   directing the large gas stream against at least one disk-shaped mixer element on an inlet or windward side thereof, wherein said at least one disk-shaped mixer element is inclined at an angle counter to the direction of flow of the large gas stream, and wherein eddy-type whirls are adapted to form at said at least one disk-shaped mixer element;
   providing a swirling device, wherein said swirling device has a fluid outlet that is provided with a rounded or curved configuration;
   admixing a swirled fluid stream swirled via said swirling device with the large gas stream downstream of said at least one disk-shaped mixer element, and
   guiding said swirled fluid stream essentially perpendicularly onto one side of said at least one disk-shaped mixer element, and essentially onto a center of said at least one disk-shaped mixer element, wherein on a discharge side a rotationally symmetrical flat, narrow fluid stream or jet is formed and is adapted to enter said eddy-type whirls of said large gas stream from said center along said discharge side.

2. A method according to claim 1, wherein said guiding step comprises guiding said swirled fluid stream essentially perpendicularly onto said discharge side of said at least one disk-shaped mixer element.

3. A method according to claim 1, which includes the further step of guiding said swirled fluid stream essentially perpendicularly onto said inlet side of said at least one disk-shaped mixer element, wherein said fluid stream is adapted to exit onto said discharge or lee side of said at least one disk-shaped mixer element through an opening provided essentially centrally in said at least one disk-shaped mixer element.

4. An apparatus for mixing at least one fluid stream with a large gas stream that is adapted to flow in a gas duct, comprising:
   at least one disk-shaped mixer element disposed in said gas duct and having an inlet or windward side and a discharge or lee side, wherein said at least one disk-shaped mixer element forms an angle with the direction of flow of the large gas stream, and wherein eddy-type whirls are adapted to form at said at least one disk-shaped mixer element;
   a tubular admixing device for said fluid stream; and
   a swirling device associated with said admixing device upstream of a fluid stream outlet of said admixing device, wherein said fluid stream outlet has a rounded or curved configuration and is oriented essentially perpendicular relative to one side of said at least one disk-shaped mixer element and essentially onto a center of said at least one disk-shaped mixer element.

5. An apparatus according to claim 4, wherein said fluid stream outlet is disposed on said discharge side of said at least one disk-shaped mixer element.

6. An apparatus according to claim 4, wherein said fluid stream outlet of said admixing device is associated with an essentially central opening of said at least one disk-shaped mixer element, and wherein said fluid stream, as a swirled fluid stream supplied essentially perpendicularly to said at least one disk-shaped mixer element, exits said opening toward a discharge side of said at least one disk-shaped mixer element.

7. An apparatus according to claim 4, wherein said at least one disk-shaped mixer element has a circular, elliptical, oval, parabolic, diamond, polygonal or triangular shape.

8. An apparatus according to claim 7, wherein said at least one disk-shaped mixer element has a polygonal shape in the form of a symmetrically structured 8-cornered shape or a trapezoidal shape.

9. An apparatus according to claim 8, wherein said 8-cornered shape is a regular 8-cornered shape.

10. An apparatus according to claim 4, wherein said at least one disk-shaped mixer element is inclined relative to the direction of flow of said large gas stream at an angle that is in the range of between 30° to 90°.

11. An apparatus according to claim 4, wherein said at least one disk-shaped mixer element is provided with an essentially central opening, and wherein a dust-protecting plate is disposed ahead of or in said opening.

12. An apparatus according to claim 4, wherein said admixing device is provided with a supply conduit, and wherein said swirling device is disposed in said supply conduit or upstream of said supply conduit.

13. An apparatus according to claim 4, wherein said swirling device is selected from the group consisting of swirl producers having radial gratings, swirl producers having axial gratings, and swirl producers having tangential in-flow.

* * * * *